(12) United States Patent
Agrawal et al.

(10) Patent No.: US 8,952,897 B2
(45) Date of Patent: Feb. 10, 2015

(54) SINGLE PAGE SOFT INPUT PANELS FOR LARGER CHARACTER SETS

(71) Applicant: Microsoft Corporation, Redmond, WA (US)

(72) Inventors: Anukrati Agrawal, Redmond, WA (US); Daniel Chang, Kent, WA (US); Sameer Garde, Redmond, WA (US); Parul Dalia, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 117 days.

(21) Appl. No.: 13/713,861

(22) Filed: Dec. 13, 2012

(65) Prior Publication Data

US 2014/0043239 A1  Feb. 13, 2014

Related U.S. Application Data

(60) Provisional application No. 61/681,912, filed on Aug. 10, 2012.

(51) Int. Cl.
*G06F 3/02* (2006.01)
*G06F 3/0488* (2013.01)
*G06F 3/023* (2006.01)

(52) U.S. Cl.
CPC .......... *G06F 3/04886* (2013.01); *G06F 3/0233* (2013.01); *G06F 3/0236* (2013.01)
USPC ........... 345/168; 345/169; 345/173; 345/171; 715/773

(58) Field of Classification Search
CPC .............. G06F 3/0236; G06F 3/04886; G06F 3/04883; G06F 17/2223; G06F 17/2863; G06F 3/0488; G06F 3/0237
USPC .......... 345/156, 168, 169, 173, 171; 715/773, 715/863

See application file for complete search history.

(56) References Cited

U.S. PATENT DOCUMENTS

| | | | |
|---|---|---|---|
| 7,721,222 B1 * | 5/2010 | Shaik | 715/773 |
| 7,979,795 B2 * | 7/2011 | Borgaonkar et al. | 715/268 |
| 8,140,994 B2 | 3/2012 | Feldman et al. | |
| 2003/0122785 A1 * | 7/2003 | Jayachandra | 345/171 |
| 2004/0225965 A1 | 11/2004 | Garside et al. | |
| 2005/0017955 A1 | 1/2005 | Jayachandra | |

(Continued)

OTHER PUBLICATIONS

International Search Report and Written Opinion for corresponding International App. No. PCT/US2013/053879, Nov. 4, 2013, 11 pages.

(Continued)

*Primary Examiner* — Koosha Sharifi-Tafreshi
(74) *Attorney, Agent, or Firm* — Timothy Churna; Kate Drakos; Micky Minhas

(57) ABSTRACT

Embodiments of a soft input panel (SIP) for an electronic device are disclosed. The SIP can be configured for entering text in a non-English language that uses a more numerous character set than does English. The characters used in the language that are available to be entered using the SIP can be available to be entered using keys on a single page of keys without switching to a different page of keys or using function keys. At least one of the keys of the SIP is a base key that is configured to open a picker window when activated. The picker window comprises plural picker keys that allow a user to select from plural different characters associated with the base key.

17 Claims, 7 Drawing Sheets

(56) References Cited

U.S. PATENT DOCUMENTS

| | | | |
|---|---|---|---|
| 2007/0156394 A1* | 7/2007 | Banerjee et al. | 704/10 |
| 2007/0174771 A1* | 7/2007 | Mistry | 715/703 |
| 2009/0037837 A1* | 2/2009 | Raghunath et al. | 715/773 |
| 2009/0058823 A1 | 3/2009 | Kocienda | |
| 2009/0262082 A1* | 10/2009 | Park et al. | 345/171 |
| 2011/0163973 A1 | 7/2011 | Ording et al. | |
| 2012/0056815 A1 | 3/2012 | Mehra | |

OTHER PUBLICATIONS

Hinkle, et al., "Design and Evaluation of Soft Keyboards for Brahmic Scripts", In ACM Transaction on Asian Language Information Processing, vol. 100, Issue100, Article 100, May 2012, 39 pages.

Gilmer, Chris, "Google on-Screen Keyboard Gadget", Published on: Aug. 17, 2007, Available at: http://downloadsquad.switched.com/2007/08/17/google-on-screen-keyboard-gadget/, 5 pages.

"On-screen Keyboards on Google Translate", Published on: Dec. 14, 2010, Available at: http://googletranslate.blogspot.in/2010/12/on-screen-keyboards-on-google-translate.html, 2 pages.

Zheng, Long, "Windows Phone 7 Mango Features Revamped SIP for Japanese; New Emoticons and All", Published on: May 26, 2011, Available at: http://www.istartedsomething.com/20110526/windows-phone-7-mango-features-revamped-sip-for-japanese-new-emoticons-and-all/, 8 pages.

* cited by examiner

SOFTWARE 780 IMPLEMENTING DESCRIBED TECHNOLOGIES

SINGLE PAGE SOFT INPUT PANELS FOR LARGER CHARACTER SETS

CROSS-REFERENCE TO RELATED APPLICATION

This application claims the benefit of U.S. Provisional Application No. 61/681,912, filed Aug. 10, 2012, which is incorporated by reference herein.

BACKGROUND

Some computing devices include a soft input panel (SIP) instead of a conventional physical keyboard for a user to enter text. A SIP is typically a substitute for a physical keyboard and typically includes a plurality of regions or panes on a touchscreen that when touched allow a user to enter a specific character or provide other functions similar to a standard keyboard.

SUMMARY

Disclosed herein are embodiments of SIPs that are configured for use with non-English languages that have character sets that are more numerous (i.e., greater number of characters) than that of English. Due to the more numerous character sets, not every character of the language can be given its own key on the SIP at the same time. In the disclosed SIPs, some keys of the SIP are configured to open picker windows when activated. The picker windows can include a plurality of picker keys for related characters that a user can choose from. By using pickers, in some embodiments, all of the consonants, vowels and diacritics used in a language can be available from a main page of keys of the SIP without having to use special function keys to change the function of other keys or cycle through different pages of keys.

In some embodiments of a SIP for an electronic device, the SIP is configured for entering text in a non-English language that uses more total consonants, vowels and diacritics than does English. The vowels, consonants, and diacritics used in the given language that are available to be entered using the SIP are available to be entered using keys on a main page of keys without switching to a different page of keys. Furthermore, at least one of the keys on the main page of keys is a base key that is configured to open a picker window when activated. The picker window comprises plural picker keys that allow a user to select from plural different characters associated with the base key.

In some of these embodiments, the base key is a diacritic base key. The diacritic base key has an associated diacritic picker window comprising plural diacritic picker keys. When the diacritic base key is activated, the diacritic picker window appears adjacent to the diacritic base key. Activating one of the diacritic picker keys selects a diacritic associated with the activated diacritic picker key and closes the diacritic picker window. Furthermore, the SIP is configured to append the selected diacritic to a consonant or a vowel that was previously selected using a key of the SIP other than the diacritic base key.

In some embodiments, every diacritic available via the SIP is available via the diacritic base key using the diacritic picker window.

In some embodiments, the SIP comprises a row of keys comprising a group of joining vowel keys, a group of independent vowel keys, and the diacritic base key.

In some embodiments, the SIP includes a group of joining vowel keys, which comprises a plurality of adjacently positioned joining vowel base keys. The joining vowel base keys are configured to activate respective vowel picker windows having two or more respective vowel picker keys. The two or more vowel picker keys can include a long form vowel picker key for selecting a long form of an associated joining vowel and a short form vowel picker key for selecting a short form of the associated joining vowel. One or more of the joining vowels of the language may not have any alternative forms and thus is not given a picker window. The joining vowel base keys can be configured to, when touched and released, select a default one of the short form of the associated vowel or the long form of the associated vowel without any of the associated picker keys being activated. In some cases, the associated picker windows may not even open when the base key is touched and released quickly.

In some embodiments, the SIP comprises a plurality of adjacently positioned independent vowel base keys. The independent vowel base keys can be configured to activate a respective vowel picker window having two or more vowel picker keys, the two or more vowel picker keys comprising a long form vowel picker key for selecting a long form of an associated independent vowel and a short form vowel picker key for selecting a short form of the associated independent vowel. Each of the joining vowel base keys and the independent vowel base keys can be configured to, when touched and released, select a short form of the respective associated vowel without any associated picker keys being activated.

In some embodiments, all of the vowels of the language are grouped together in one row of keys of the SIP, such as the top row of keys of the SIP. In some embodiments, the diacritic base key can also be in the same row as the vowels.

In some embodiments, at least one of the keys on the main page of the SIP can comprise a consonant base key. The consonant base key can have an associated picker window comprising plural consonant picker keys. The plural consonant picker keys can represent a group of similarly sounding consonants, a group of similarly appearing consonants, a group of similarly used consonants, and/or a group of infrequently used consonants.

In some embodiments, each vowel, consonant and diacritic of the non-English language can be entered by touching and releasing the SIP only once from the same page of the SIP, either by touching and releasing from the same key of the SIP, or by sliding across different keys of the SIP between the touching and the releasing.

In some embodiments, all of the vowels, consonants, and diacritics available to be entered using the SIP are available to be entered without using any key that has a primary purpose of changing the function of other keys.

This Summary is provided to introduce a selection of concepts in a simplified form that are further described below. This Summary is not intended to identify key features or essential features of the claimed subject matter, nor is it intended to be used to limit the scope of the claimed subject matter. The foregoing and other objects, features, and advantages of the technology will become more apparent from the following detailed description, which proceeds with reference to the accompanying figures.

DETAILED DESCRIPTION

Figure 1:
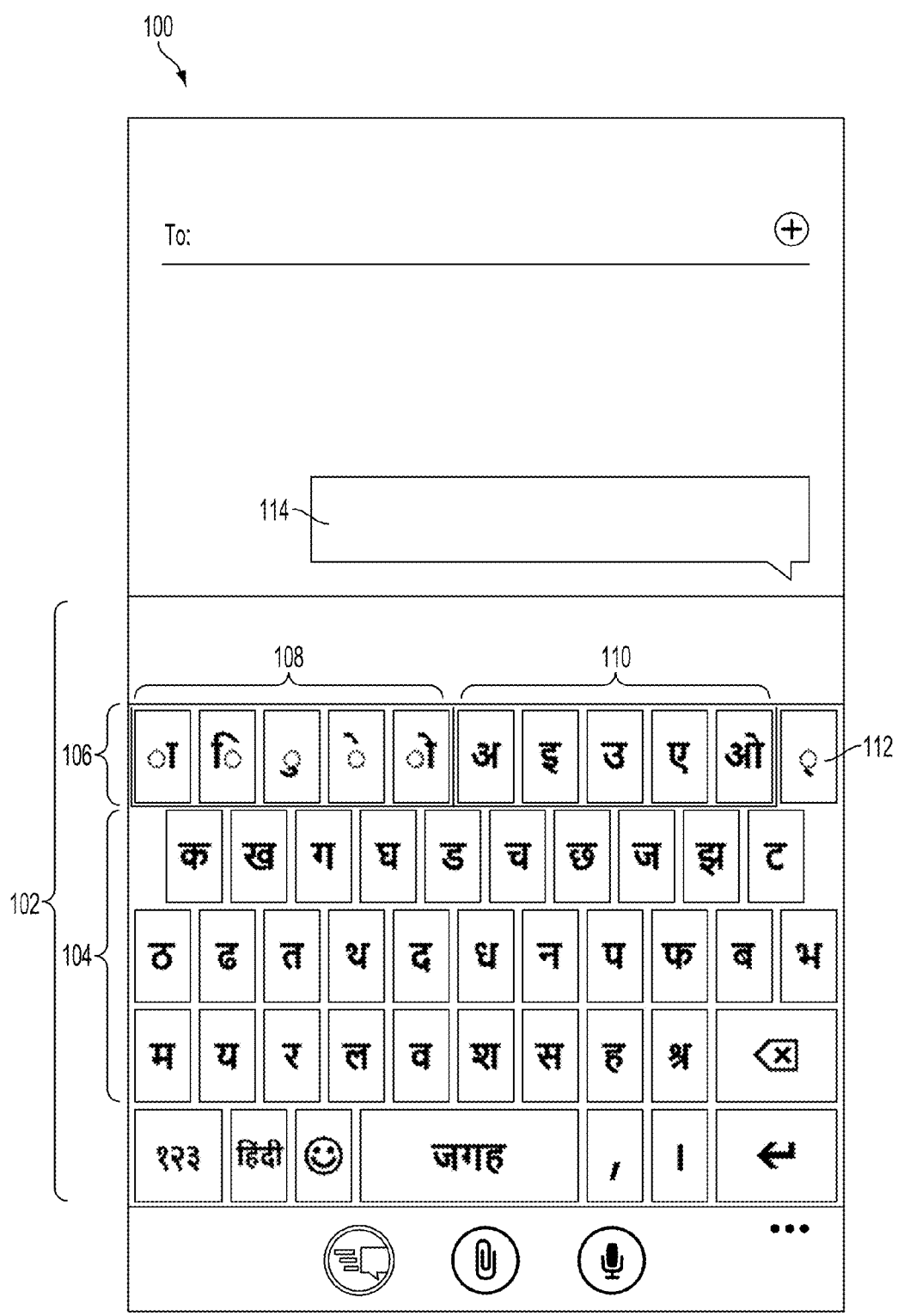
FIG. 1 shows an exemplary touchscreen of a computing device having an SIP.

FIG. 1 shows an exemplary touch-sensitive input and display device, or touchscreen, 100 of a computing device, such as a tablet or mobile phone. The touchscreen 100 comprises a Soft Input Panel (SIP) 102 that allows a user to select text characters and enter other commands, such as "enter" and "backspace," by touching the screen. The SIP can be used for many different tasks, such as writing text messages or emails, entering data on a website, etc. In the particular example shown in FIG. 1, the SIP 102 is ready for use in drafting a text message.

The SIP 102 can comprise a plurality of discrete regions of the touchscreen 100, also referred herein to as "keys." An exemplary key is shown as 112. The keys can be rectangular or have other shapes. The keys can be arranged in any pattern, such as in rows as shown in the example of FIG. 1. Each of the keys can be used to perform a different command by touching the key. Exemplary commands can include entering a text character, backspacing, shifting to a different set of keys, etc. Entered text characters can be shown at another region of the touchscreen 100, such as the text box 114 shown in FIG. 1. To indicate what command each key performs, each key can include an indicator or symbol, such as the character that represents the character that is entered by touching the key. The keys can be grouped by type. For example, in FIG. 1, the top row 106 includes mostly vowels and the middle rows 104 include mostly consonants.

The size of the touchscreen 100 can limit the available space for the SIP 102, and the number of keys shown in the SIP at a given time can be limited to by the size of the SIP. If the keys are made too small, a user may have trouble reading the symbols on the keys and may have trouble accurately touching a desired key without also touching other keys nearby and issuing unintended commands. In addition, presenting too many keys in the SIP at one time can make finding a desired key more difficult, and can make the SIP aesthetically unpleasing.

For these and other reasons, it can be desirable and/or necessary to display only a limited number of keys in a SIP at any given time. In some embodiments, at least one of the keys, referred to herein as a "function key," can perform the function of changing the function of some or all of the other keys. Function keys can comprise keys commonly known as shift keys, control keys, alt keys, and other keys that have a primary purpose of changing function of other keys or cycling through different pages of keys, rather than directly entering characters. The set of keys of a SIP can initially be set to perform a certain set of functions. This initial set of functions can include many of the most commonly used functions, such as entering commonly used text characters, the return function, the backspace function. Touching a function key can then change the function of one or more of the keys to a different function, such as entering less commonly used characters. As the function of the keys change, the symbol on each key can also change to indicate the new function that the key provides. In some embodiments, touching a function key again, or touching another function key, can again change the function of one or more of the keys. In some cases, touching a function key a certain number of times can eventually return the keys to their initial functions.

Using function keys to change the functions of other keys, however, can be time consuming, difficult, aesthetically unpleasing, and/or generally undesirable for a user. Instead of, or in addition to, using a function key to access additional functions, the SIP 102 utilizes one or more "pickers" to provide access to additional functionality. A picker is a window that opens or appears in response to touching a certain key in the SIP 102. The picker window can comprise two or more picker keys that provide different functions that a user can choose from by touching one of the picker keys in the picker window. A picker window can open or appear over other keys in the SIP 102 and/or over other regions of the touchscreen 100. When a picker window opens, other portions of the SIP 102 can become a background by becoming darker or with a similar effect.

Figure 2:
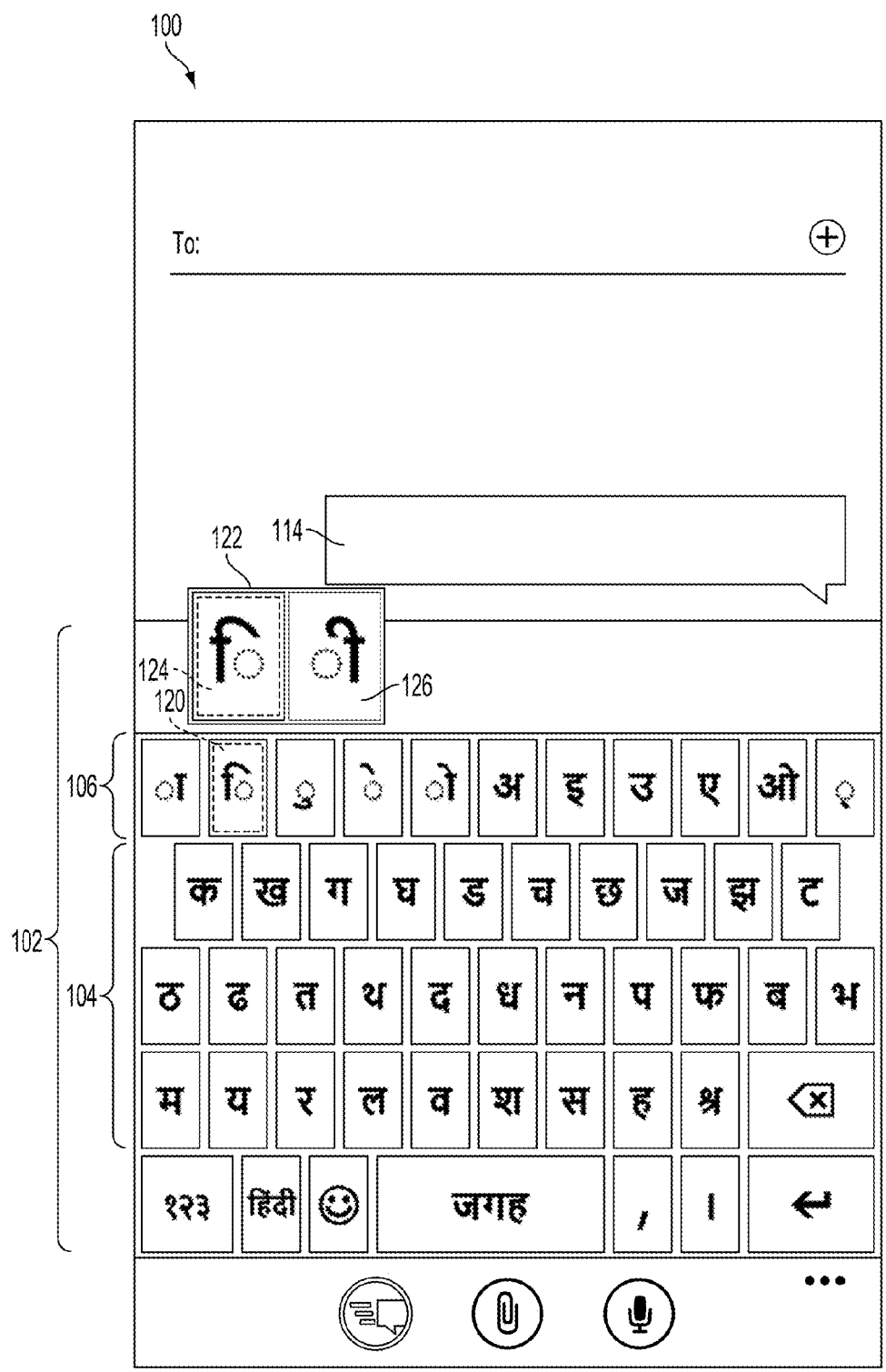
FIG. 2 shows the touchscreen of FIG. 1 with an exemplary vowel picker open.

FIG. 2 shows an example of a picker window 122. In this example, touching the key 120 causes the picker 122 to open just above the key 120 on the touchscreen 100. The picker 122 comprises two keys 124, 126 that the user can choose from by touching one of them. Each of the two picker keys 124, 126 has a different symbol and provides a different function. The key 120 that causes the picker 122 to open can be called a "base key." The keys of a picker can be related to the symbol shown in the base key in a logical manner, such as variations of the same vowel or consonant, or collections of similarly looking, sounding, or used letters. For example, the base key 120 shows a symbol of a certain vowel, and its respective picker keys 124, 126 allow the user to choose between a long form of that vowel and a short form of that vowel. This is just one example, and many other types of relationships between a base key and its respective picker keys can be employed.

In some embodiments, the base key remains visible when its associated picker window is open. The picker window can be positioned just above, or otherwise adjacent to, the associated base key.

In some embodiments, the keys of a picker window can be sized larger than their respective base key. For example, in FIG. 2, the picker keys 124, 126 are about 50% larger in size than the base key 120. The larger size can make it easier for a user to read and touch the picker keys. In addition, the larger size can allow more detailed symbols to be fitted in the picker keys, which can help differentiate the plural different keys of a picker window.

In some embodiments, the background of the SIP 102 can become darker when a picker window opens such that the picker window is brighter that the rest of the SIP. For example, in FIG. 2, the picker keys 124, 126 are brightly displayed while the base key 120 and the other keys of the SIP are darkened. This provides a contrast that can focus a user on the picker window 122 while it is open.

In some embodiments, the base key can become highlighted when it is touched and a picker window opens. For example, in FIG. 2, the base key 120 has become highlighted in response to being touched. The highlighting can comprise changing colors, bolding, or other visual cues. The highlighting of the base key 120 can remain until a selection from the picker keys 124, 126 is made, after which the picker window 122 can close and the base key 120 can revert to an non-highlighted state, such as changing back to an original color. In other embodiments, a base key can be highlighted in other manners, such as by outlining the key, making the key brighter, changing the color of the symbol on the key, etc. By highlighting the base key while a picker window is open, a user can more readily see to which base key a currently open picker window is related.

In some embodiments, a base key can be touched to close a picker window. For example, if a base key is touched inadvertently and its picker window opens, a user can touch the base key again to close the picker window instead of selecting one of the picker keys, which can also close the picker window, but also enters a character or other function. By highlighting the base key when the picker window is open, a user can more readily identify the corresponding base key in order to touch that base key again to close the picker window.

In some embodiments, a picker window appears or opens only when a corresponding base key is touched and released. This type of base key can be referred to as a "touch-and-release" base key. In these embodiments, simply touching and holding a touch-and-release base key can in some cases cause the base key to become highlighted, but does not cause the picker window to open. In these embodiments, only when the touch-and-release base key is touched and released does the picker window open. If, after touching the touch-and-release base key, a user decides not to proceed with opening the picker window, the user can slide his finger or stylus off of the touch-and-release base key without releasing and the picker window will not open. In some embodiments, sliding to an adjacent touch-and-release base key and then releasing from that base key can open a different picker window corresponding the that different base key. In some embodiments, as the user's finger or stylus slides across different keys, the currently touched key can become highlighted and the previously touched key can stop being highlighted. Sliding off of a touch-and-release base key to a neutral, or non-functional, area of the touchscreen apart from any SIP key and releasing can result in no function being entered.

In the case of a touch-and-release base key, the picker window can open upon releasing the key and the picker window can remain open indefinitely until another action is taken by the user, such as touching one of the picker keys to enter a character or touching the base key again to close the window.

In some embodiments, a picker window appears as soon as the corresponding base key is touched. The user can then slide his finger or stylus from the base key to one of the picker keys and release from a selected picker key to select that picker key. This type of base key can be termed a "touch-and-slide" base key. With some touch-and-slide base keys, if the user does not slide from the touched base key and releases from the touched base key, the picker window can close without any function being performed. With other touch-and-slide base keys, touching and releasing the base key without sliding can cause a predetermined, or default, function to be entered. For example, the default function can be repeating a previous selection from among the corresponding picker keys that was made by a user when that touch-and-slide base key was used. In other examples, the default function can be entering the most commonly used one of the functions provided by the picker keys corresponding to that touch-and-slide base key.

In some embodiments, the default function is symbolized on the base key. In some embodiments, the default function is also provided as one of the alternative options from among the associated picker keys, typically as the first picker in the picker window and/or as the closest picker key to the base key. Thus, the default function can be selected be touching and releasing the base key or by touching the base key, sliding to one of the picker keys with the same symbol, and releasing from that picker key.

In the example of FIG. 2, if the base key 120 is assumed to be a touch-and-slide base key, the picker window 122 would open as soon as the base key 120 is touched. The user can then slide to either picker key 124 or 126 and release to select the function of either picker key. The user can also just release from the base key 120 without sliding. In that case, the picker window 122 can simply close without any function being entered, or a predetermined one of two functions represented by the picker keys 124, 126 can be entered. In some embodiments, pressing and releasing the base key 120 can always cause the same function to be entered, such as the function represented by picker key 124. In other embodiments, pressing and releasing the base key 120 can repeat which ever was the last function to be selected by a user from among the picker keys 124, 126. In either case, the predetermined one of the picker keys that will be selected by default if the base key is released without sliding can be highlighted. For example, in FIG. 2, the picker key 124 is highlighted to indicate that the function of that key will be entered by default if the base key is released. The picker keys can also be highlighted as a user slides across them when directly selecting one of them after touching the base key. For example, if the user were to touch base key 120 can slide to picker key 126, the picker key 124 can return to a non-highlighted state and the picker key 126 can become highlighted. This can help the user determine which picker key is currently being touched so the user can know that releasing will cause a desired picker key's function to be entered.

In some embodiments of the SIP 102, some keys can comprise touch-and-release base keys while other keys can comprise touch-and-slide base keys.

Related functions can be grouped together in common picker windows to create a more user-friendly interface. Various design considerations can be used to determine how many base keys are provided with picker windows, where those base keys are located on the SIP, which functions and how many functions are grouped together in various picker windows, and which picker keys are set as default functions for the corresponding base key. Many of these considerations can be related to the particular language and/or character set that is used by the SIP.

The SIP 102 can be configured for use with many different languages and/or language scripts. For example, the SIP 102 shown in FIGS. 1-4 is configured for use with Devanagari Hindi. Different languages and language scripts can vary in the number of different text characters they use. Certain languages, such as English and Spanish, can include relatively small characters sets, while other languages, such as Arabic, Persian, and Hindi, can include much more numerous character sets.

In many cases, several different languages share a common character set, or script. For example, the Devanagari script, which is shown in the example of FIGS. 1-4, can be used with Hindi, Gujarati, Bhojpuri, Pahari, Konkani, Gujari, Marwari, and other languages.

For more numerous character sets, it can be more difficult to provide access to all of the characters on the keys of a SIP. As discussed above, only a limited number of keys can be present on a SIP at a given time. In these cases, the use of picker windows can provide quick and easy access to more of the different characters without having to use separate function keys to cycle through various pages of different keys.

Referring back to FIG. 1 again, some of the characters of the Devanagari script are shown on the keys of the SIP 102. Many of the keys are not base keys and simply serve the function of entering the character shown on the key. In the example of a text message application, the characters appear in the text box 114 when entered. In addition to text characters, several other function keys are present along the lower portion of the SIP 102, such as the backspace key, return key, space bar key, emoticon key, punctuation key, numerals key, etc.

In the example of FIG. 1, the middle three rows of keys, labeled 104 collectively, represent consonant keys (expect for the backspace key) and the top row of keys, labeled 106 collectively, represents ten vowel keys and a diacritic key 112. The vowel keys are grouped into two groups. The first five keys on the left of row 106 represent "joining vowels" and are labeled collectively as 108. The next five keys from the left represent "independent vowels" and are labeled collectively as 110. This is just one exemplary arrangement of characters among the keys of a SIP, and many other arrangements are possible, such placing the vowel keys in a different row, moving the diacritic key 112 to the left hand side of row 106, etc.

In Devanagari Hindi, vowels can have both a long form and a short form. This is also the case in many other languages. In some cases, the short form of a vowel can be represented with a different character than the long form a vowel, which can necessitate two different character options on the SIP 102. Accordingly, in the SIP 102, many of the vowels keys in groups 108 and 110 can be base keys that correspond to a picker window that provides at least two picker keys representing the short and long forms, respectively, of the vowel indicated on the base key.

For example, in FIG. 2, a picker window 122 is open for the base key 120. The base key 120 shows the symbol ि, which is the short form a vowel in Devanagari Hindi. The base key 120 is highlighted to indicate that it has been touched and that the open picker window 122 corresponds to it. The picker window 122 is open just above the base key 120 to allow the user to quickly move from the base key 120 to one of the picker keys 124, 126. The picker key 124 shows the same symbol ि for the short form the vowel, and the picker key 126 shows the symbol ी, which is the long form of the same vowel. Using the picker 122, a user can quickly and easily select either the short or long form of the vowel to enter into the text box 114, while only one base key on the SIP 102 is used for both characters.

Each of the joining vowel keys in the group 108 includes a symbol depicting the joining vowel and its relationship to base letter to which the joining vowel is added. The base letter is represented by a dashed or dotted circle adjacent to the symbol for the joining vowel. For example, in the joining vowel key 120, the joining vowel is positioned to the left of the dotted circle indicating that the joining vowel will be positioned to the left of the associated base letter. In some embodiments, pressing the key 120 adds that joining vowel to the left of the last letter entered via the SIP, while in other embodiments pressing the key 120 adds that joining vowel to the left of the next letter entered via the SIP.

Similarly, other vowel keys in the groups 108 and 110 can be base keys having a picker window that provides the option of either the long or short form of the vowel. Some of the vowel base keys in groups 108 and 110 can have pickers windows with more than two picker keys, such as if a particular vowel has more than two different corresponding characters. One or more of the vowels can have just one associated character, and the corresponding vowel key need not be a base key with a picker window. For example, the leftmost key in the top row 106 of the SIP 102 (see FIG. 1) represents the joining vowel which only has a long form sound and only one character. Since there are no alternative characters for that vowel, no picker is needed for that key.

In the example of FIG. 1, all of the joining vowels 108 are grouped together on five adjacent keys at the left of the top row 106 and all of the independent vowels 110 are grouped together on the next five keys to the right of the joining vowels 108 in the top row 106. For the vowel keys that have pickers associated with them, the base keys can be touch-and-slide base keys. All of the vowel base keys can be set to enter the short form of the particular vowel, or alternatively the long form of the particular vowel, when the base key is touched and released without sliding. In the case where the default for touch-and-release is the short form of the vowels, then the user can touch and slide to the picker key with the long form of the vowel in order to enter the long form, or just touch and release the base key to enter the short form of the vowel.

In the embodiment of FIG. 1, at least one form of all ten vowels is shown on the main page of the SIP 102. In addition, at least one form of all ten vowels is selectable by the touching and releasing a single key on the main page of the SIP without any sliding or holding being needed. Thus, the user has the option of entering text in a quicker and easier shorthand style by using at least some of the short forms of the vowels instead of the long forms of the vowels. At the same time, the user still has the ability to create more formal text by using the pickers to use both the short forms and long forms of the vowels. The accessibility of at least one form of each vowel is quickly without using pickers or switching pages, along with other design factors of the SIP, can help users type at a faster speed in a scenario where spelling and grammar formalities are less important, such as in a friendly text messaging context.

In an alternative embodiment (not shown), the ten keys of groups 108 and 110 of FIG. 1 can be used to enter the ten forms the independent vowels (five short forms and five long forms) by default (i.e., via touching and releasing the base key without sliding), and nine pickers associated with those keys can be used to select the joining vowels.

In another alternative embodiment, a SIP comprises only two vowel base keys, one for short vowel forms and one for long vowel forms, and each of the two vowel base keys has an associated picker with nine or ten picker keys (nine for the short form vowels and ten for the long form vowels). This can further condense the space occupied on the SIP by vowel keys.

In yet another alternative embodiment, a SIP can comprise five vowel base keys, one for each of the five short form independent vowels. Each vowel base key can comprise a picker with three or four picker keys. For each short independent vowel, the picker can comprise additional picker keys for the long form the independent vowel, for the short form of the joining version of the same vowel, and for the long form of the joining version of the vowel. Many other arrangements of the vowel base keys and picker keys are possible.

Because the vowel base keys are positioned in the upper row 106 of the SIP 102, the vowel picker windows (e.g., window 122 in FIG. 2) can appear just above the base keys and not overlap any of the other keys of the SIP. In the illustrated text messaging example, the picker window 122 opens in a dark region between the upper row 106 and the text box 114. This area can effectively be considered a temporary extra row for the SIP 102 that is used only for picker keys associated with the base keys in the row 106.

In addition to vowels and consonants, many languages also use a plurality of different diacritics. Diacritics are marks or glyphs added before, after, above, below, within or otherwise adjacent to or touching another letter to change the sound, meaning, and/or pronunciation of that letter. In some SIP embodiments, it can be convenient to group two or more of the diacritics used in a particular language together as picker keys associated with one or more diacritic base keys. It can be particularly desirable to group rarely used diacritics together in a picker.

Figure 3:
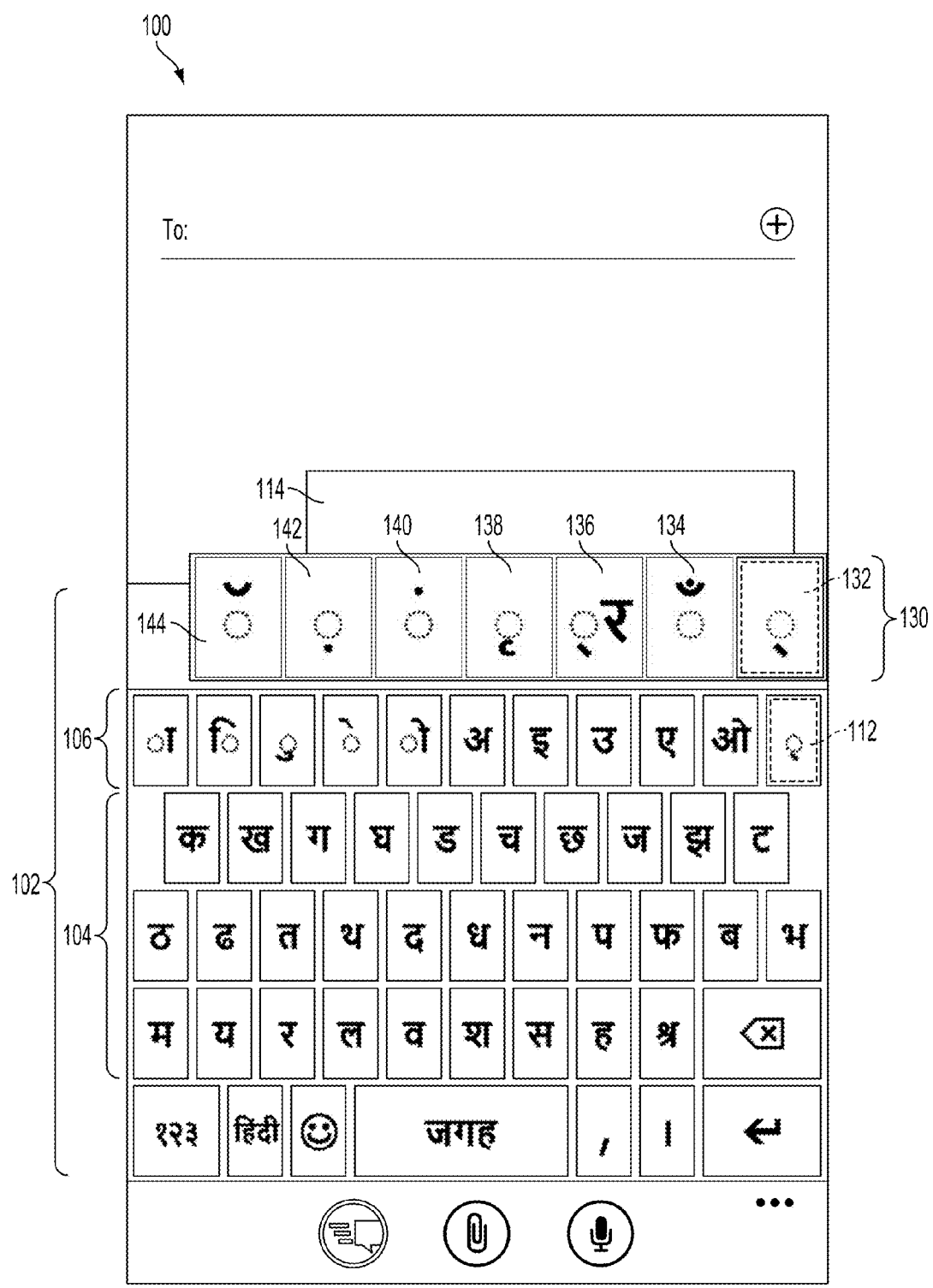
FIG. 3 shows the touchscreen of FIG. 1 with an exemplary diacritic picker open.

In the example of FIG. 3, the right hand key in the top row 106 of the SIP 102 comprises a diacritic base key 112. In this embodiment, the key 112 is the only diacritic base key. The key 112 is shown highlighted to indicate that it has be touched and that the diacritic picker window 130 that is open corresponds to the base key 112. The diacritic base key 112 can be set to default to a commonly used diacritic, for example. The right hand picker key 132 corresponds to the default diacritic in this example.

Each of the diacritic keys includes a symbol depicting the diacritic and its relationship to the base letter to which the diacritic is added. The base letter is represented by a dashed or dotted circle in the middle of the key. For example, in the diacritic picker key 140, the diacritic is a dot that is positioned above a base letter. In some embodiments, pressing the key 140 adds that dot mark above the last letter entered via the SIP.

Assuming that the diacritic base key is a touch-and-slide base key, the can touch the key 112 and the slide his finger or stylus across the diacritic picker window do select from among the various diacritic picker keys 134, 136, 138, 140, 142 and 144. These diacritic picker keys can be organized in any convenient manner, such as having the least commonly used diacritics to the left and the most commonly used diacritics near to the base key 112. The diacritic picker key that is currently being touched can be highlighted. Releasing from the highlighted picker key selects that diacritic.

Diacritics can often be used in specific conjunction with a letter. In some embodiments of the SIP 102, a diacritic can be entered immediately after entering a letter in order to associate the diacritic with that letter.

For languages where diacritics are more frequently used, more than one base key can be used for entering diacritics. For example, instead of having a single diacritic base key with an associated picker window having many keys all of the various possible diacritics for that language, the SIP can have two or more diacritic base keys, each having a picker window with a related subset of the diacritics.

Figure 4:
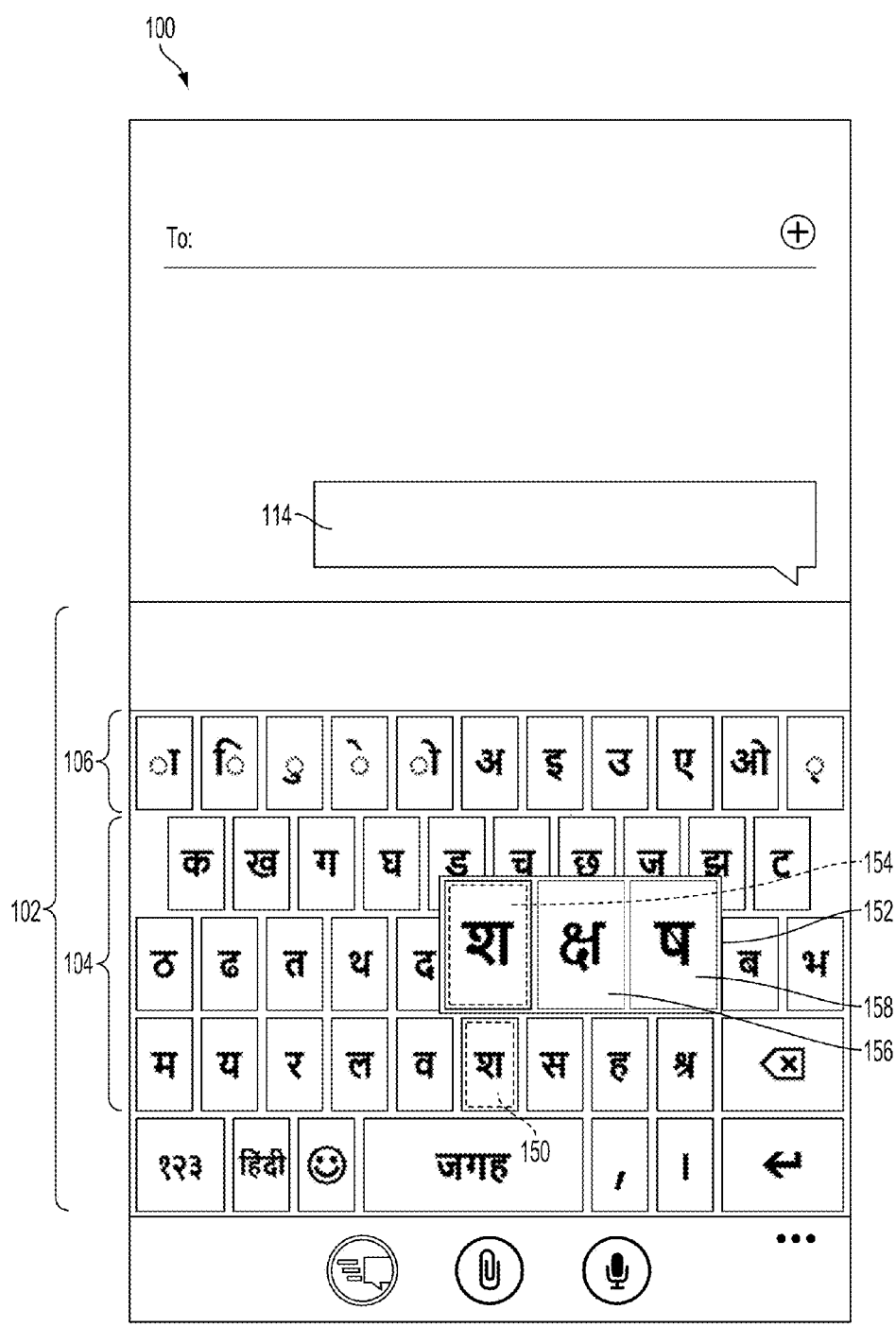
FIG. 4 shows the touchscreen of FIG. 1 with an exemplary consonant picker open.

In addition to vowels and diacritics, in languages having greater numbers of consonants, some of the consonants can be grouped together with one or more pickers. In particular, groups of rarely used consonants can be grouped with pickers. FIG. 4 illustrates an exemplary consonant base key 150 and an associated picker window 152 having picker keys 154, 156 and 158. In this example, the consonants ś a, ksha, and ṣ a are represented by the keys 154, 156, and 158, respectively. This can be convenient when the number of consonants in the language used by the SIP is greater than the number of available keys in the middle three rows 104 of the SIP 102 (not counting the backspace key). In the illustrated example, by grouping three of the consonants on a picker for a consonant base key 150, all of the other consonants of the language can have their own key on the main page of the SIP 102.

The consonants selected to be grouped on the picker 152 can share common characteristics, such as a common sound, common appearance, common use, and/or rarity of use, such that the user finds the grouping logical and convenient. Grouping similarly sounding letters together in a picker allows a user to have the option of writing in shorthand by simply selecting the default consonant on the base key by quickly touching and releasing the base key in order to indicate the common sound instead of having to use the picker to select the more proper consonant. By way of analogy with English, this can be similar to grouping the consonants "C" and "K" together since they sometimes provide a common sound. The letter "C" could be the default letter, and the "K" could be on one of the picker keys. When writing a shorthand, informal text message, a user could then simply use a "C" in place of a "K" to save time. Another analogy with English would be to have a consonant picker with the rarely used letters X, Q and Z on a picker.

Many of the exemplary pickers discussed herein can be based on either touch-and-slide base keys or touch-and-release base keys. The consonant base key 150 shown in FIG. 4, for example, could be a touch-and-release base key, such that touching the base key once opens the picker window and subsequently touching one of the picker keys selects that consonant. In some embodiments, a quick touch-and-release of a base key can select a default character without a picker window opening at all, while a longer touch and release, or a touch and hold, can be used to open the picker window.

In some embodiments, a base key can have one or more symbols on it that represent the plural different characters available in the associated picker window. For example, a consonant base key can have the symbols "X, Y, Z" on the base key to indicated that an associated consonant picker associated with that base key includes picker keys for each of the letters "X", "Y", and "Z". The fact that the "X" is listed first can indicate that the "X" is the default letter for that base key.

In other embodiments, a base key can include an additional indicator, such as a small dot or colored portion, that indicates that there is a picker associated with that key. In other embodiments, a bolded, underlined or italicized symbol can indicate that a picker is associated with a key.

By using pickers to group and organize plural characters, fewer keys are needed to present all, or at least most, of the characters of a given character set on a single page of a SIP. It can be quicker, easier, and more aesthetically pleasing for a user to use pickers to select from groups of characters than to use a function key to cycle through plural pages of different individual character keys. Furthermore, grouping characters in pickers in logical ways can make the text entry process more intuitive and even faster for the user. In addition, a special function key can be eliminated altogether in some cases, providing more room for other keys. Fewer keys, larger keys, staggered keys, and/or more space between the keys can also provide a less cluttered and more user friendly appearance, making it easier to find keys and harder to mis-touch a key.

Figure 5:
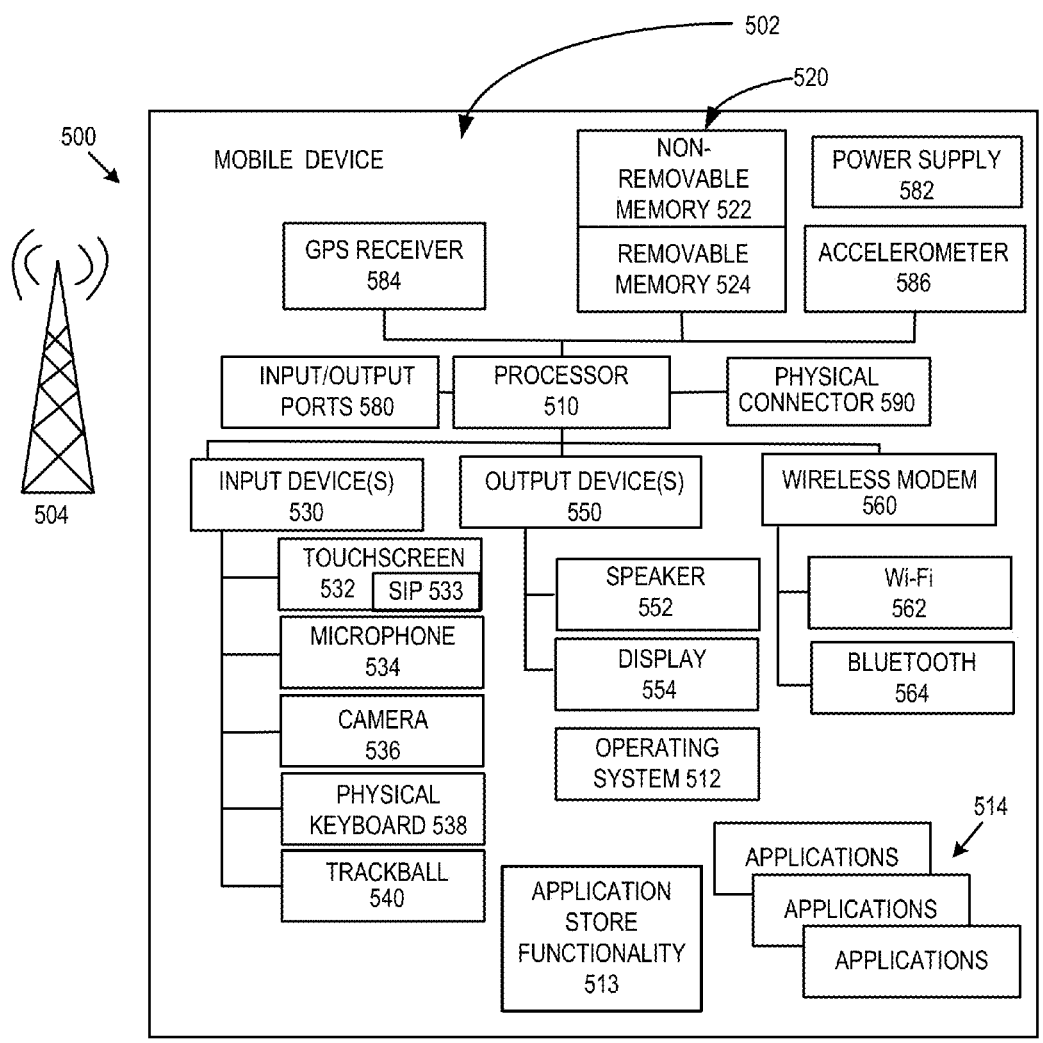
FIG. 5 is a schematic diagram depicting an exemplary mobile device with which any of the disclosed embodiments can be implemented.

FIG. 5 is a system diagram depicting an exemplary mobile device 500 including a variety of optional hardware and software components, shown generally at 502. Any components 502 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 504, such as a cellular or satellite network.

The illustrated mobile device 500 can include a controller or processor 510 (e.g., signal processor, microprocessor, ASIC, or other control and processing logic circuitry) for performing such tasks as signal coding, data processing, input/output processing, power control, and/or other functions. An operating system 512 can control the allocation and usage of the components 502 and support for one or more application programs 514. The application programs can include common mobile computing applications (e.g., email applications, calendars, contact managers, web browsers, messaging applications), applications related to the functionality of the SIP 533 (such as applications for downloading and using alternative languages with the SIP, layout and appearance customization applications, etc.), or any other computing application.

The illustrated mobile device 500 can include memory 520. Memory 520 can include non-removable memory 522 and/or removable memory 524. The non-removable memory 522 can include RAM, ROM, flash memory, a hard disk, or other well-known memory storage technologies. The removable memory 524 can include flash memory or a Subscriber Identity Module (SIM) card, which is well known in GSM communication systems, or other well-known memory storage technologies, such as "smart cards." The memory 520 can be used for storing data and/or code for running the operating system 512 and the applications 514. Example data can include web pages, text, images, sound files, video data, or other data sets to be sent to and/or received from one or more network servers or other devices via one or more wired or wireless networks. The memory 520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 500 can support one or more input devices 530, such as a touchscreen 532 (e.g., the touchscreen 100 in FIGS. 1-4), microphone 534, camera 536, physical keyboard 538 and/or trackball 540 and one or more output devices 550, such as a speaker 552 and a display 554. Other possible output devices (not shown) can include piezoelectric or other haptic output devices. Some devices can serve more than one input/output function. For example, touchscreen 532 and display 554 (e.g., the touchscreen 100 in FIGS. 1-4) can be combined in a single input/output device. The input devices 530 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition (such as with the touchscreen 100 and SIP 102 of FIGS. 1-4), gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 512 or applications 514 can comprise speech-recognition software as part of a voice user interface that allows a user to operate the device 500 via voice commands. Further, the device 500 can comprise input devices and software that allows for user interaction via a user's spatial gestures, such as detecting and interpreting gestures to provide input to a gaming application.

A wireless modem 560 can be coupled to an antenna (not shown) and can support two-way communications between the processor 510 and external devices, as is well understood in the art. The modem 560 is shown generically and can include a cellular modem for communicating with the mobile communication network 504 and/or other radio-based modems (e.g., Bluetooth 564 or Wi-Fi 562). The wireless modem 560 is typically configured for communication with one or more cellular networks, such as a GSM network for data and voice communications within a single cellular network, between cellular networks, or between the mobile device and a public switched telephone network (PSTN).

The mobile device can further include at least one input/output port 580, a power supply 582, a satellite navigation system receiver 584, such as a Global Positioning System (GPS) receiver, an accelerometer 586, and/or a physical connector 590, which can be a USB port, IEEE 1394 (FireWire) port, and/or RS-232 port. The illustrated components 502 are not required or all-inclusive, as any components can be deleted and other components can be added.

Figure 6:
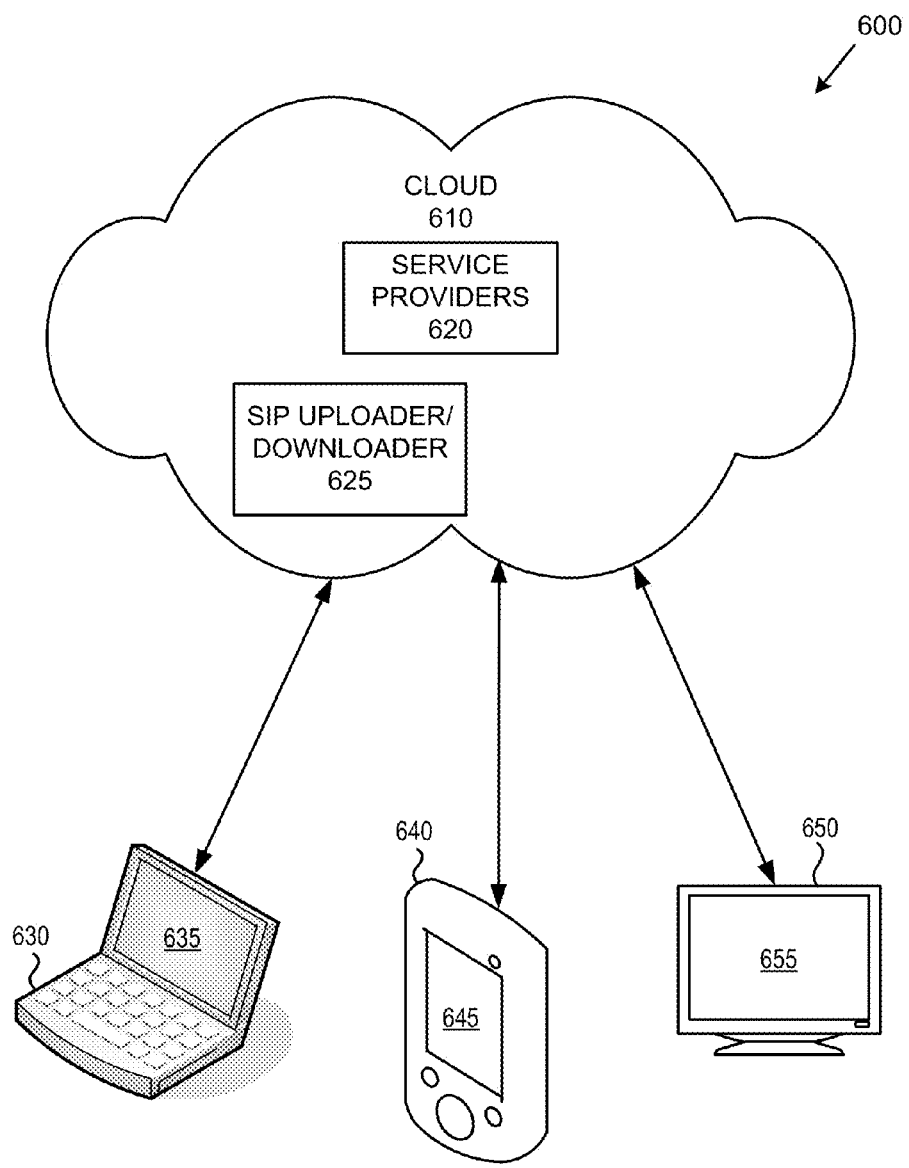
FIG. 6 is a schematic diagram illustrating a generalized example of a suitable implementation environment for any of the disclosed embodiments.

FIG. 6 illustrates a generalized example of a suitable implementation environment 600 in which described embodiments, techniques, and technologies may be implemented.

In example environment 600, various types of services (e.g., computing services) are provided by a cloud 610. For example, the cloud 610 can comprise a collection of computing devices, which may be located centrally or distributed, that provide cloud-based services to various types of users and devices connected via a network such as the Internet. The implementation environment 600 can be used in different ways to accomplish computing tasks. For example, some tasks (e.g., processing user input and presenting a user interface) can be performed on local computing devices (e.g., connected devices 630, 640, 650) while other tasks (e.g., storage of data to be used in subsequent processing) can be performed in the cloud 610.

In example environment 600, the cloud 610 provides services for connected devices 630, 640, 650 with a variety of screen capabilities. Connected device 630 represents a device with a computer screen 635 (e.g., a mid-size screen). For example, connected device 630 could be a personal computer such as desktop computer, laptop, notebook, netbook, or the like. Connected device 640 represents a device with a mobile device screen 645 (e.g., a small size screen). For example, connected device 640 could be a mobile phone, smart phone, personal digital assistant, tablet computer, or the like. Connected device 650 represents a device with a large screen 655. For example, connected device 650 could be a television screen (e.g., a smart television) or another device connected to a television (e.g., a set-top box or gaming console) or the like. One or more of the connected devices 630, 640, 650 can include touchscreen capabilities. Touchscreens (e.g., touchscreen 100 of FIGS. 104) can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 600. For example, the cloud 610 can provide services for one or more computers (e.g., server computers) without displays.

Services can be provided by the cloud 610 through service providers 620, or through other providers of online services. For example, cloud services can be customized to the screen size, display capability, and/or touchscreen capability of a particular connected device (e.g., connected devices 630, 640, 650). Exemplary services provided by the cloud 610 can include a SIP uploader/downloader service 625 that allows connected devices to transfer SIP information and SIP related application with the cloud and with outer connected devices. For example, a connected device can download a SIP update from the SIP uploader/downloader 625 to update the SIP for a different language, to transfer a SIP to a different device, or for other changes.

In example environment 600, the cloud 610 provides the technologies and solutions described herein to the various connected devices 630, 640, 650 using, at least in part, the service providers 620. For example, the service providers 620 can provide a centralized solution for various cloud-based services. The service providers 620 can manage service subscriptions for users and/or devices (e.g., for the connected devices 630, 640, 650 and/or their respective users).

Figure 7:
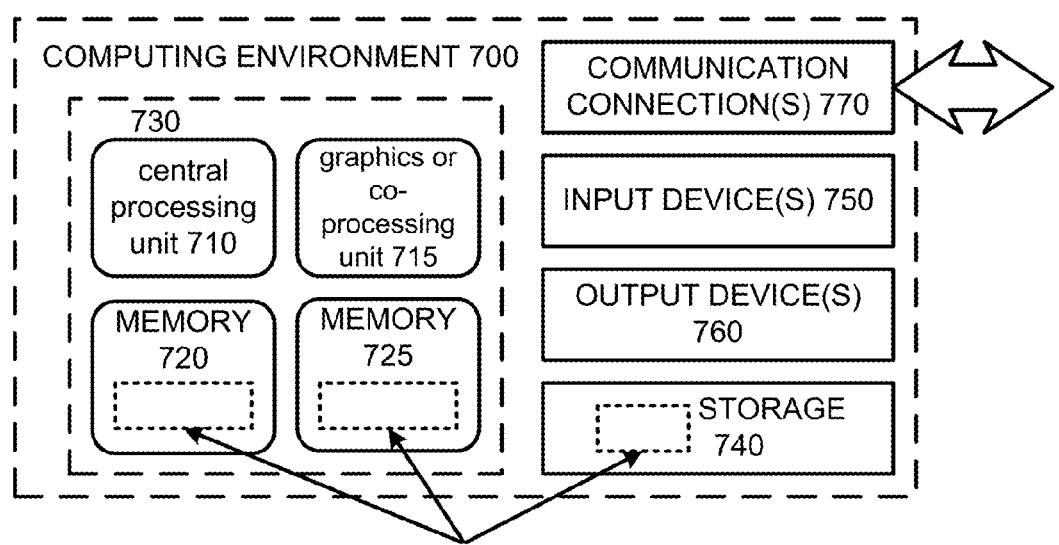
FIG. 7 is a schematic diagram illustrating a generalized example of a suitable computing environment for any of the disclosed embodiments.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, media player, gaming system, mobile device, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other storage device which can be used to store information and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. For video encoding, the input device(s) 750 may be a camera, video card, TV tuner card, or similar device that accepts video input in analog or digital form, or a CD-ROM or CD-RW that reads video samples into the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

As used herein, the term "and/or" used between the last two of a list of elements means any one or more of the listed elements. For example, the phrase "A, B, and/or C" means "A," "B," "C," "A and B," "A and C," "B and C" or "A, B and C."

In view of the many possible embodiments to which the principles disclosed herein may be applied, it should be recognized that the illustrated embodiments are only preferred examples and should not be taken as limiting the scope of the disclosure. The scope of the inventions is defined by the following claims. We therefore claim as our inventions all that comes within the scope of these claims.

We claim:

1. A soft input panel (SIP) for an electronic device, wherein the SIP is configured for entering text in a non-English language, wherein the vowels, consonants, and diacritics used in the non-English language that are available to be entered using the SIP are available to be entered using keys on a main page of keys without switching to a different page of keys or using function keys, and wherein at least one of the keys of the SIP is a diacritic base key that is configured to open a diacritic picker window when activated, the diacritic picker window comprising plural diacritic picker keys, the plural diacritic picker keys representing different diacritics used in the non-English language;

wherein a plurality of the keys are vowel base keys configured to open a vowel picker window when activated, the vowel picker window comprising a short form vowel key and a long form vowel key;

wherein joining vowels of the non-English language are grouped together in a first group of keys and independent vowels of the non-English language are grouped together in a second group of keys adjacent to the first group of keys; and wherein consonants of the non-English language are grouped together in a third group of keys, at least one key of the third group of keys comprising a consonant base key configured to open a consonant picker window when activated, the consonant picker window comprising a plurality of consonant picker keys each associated with a different consonant of the non-English language.

2. The SIP of claim 1, wherein when the diacritic base key is activated the diacritic picker window appears adjacent to the diacritic base key, wherein activating one of the diacritic picker keys selects a diacritic associated with the activated diacritic picker key and closes the diacritic picker window, and wherein the SIP is configured to append the selected diacritic to a consonant or a vowel that was previously selected using a key of the SIP other than the diacritic base key.

3. The SIP of claim 1, wherein every diacritic available via the SIP is available via the diacritic base key.

4. The SIP of claim 1, wherein the SIP comprises a row of keys comprising a group of joining vowel keys, a group of independent vowel keys, and the diacritic base key.

5. The SIP of claim 1, wherein the first group of keys comprises a plurality of adjacently positioned joining vowel base keys, the joining vowel base keys being configured to activate respective vowel picker windows having two or more respective vowel picker keys, the two or more vowel picker keys comprising the long form vowel picker key for selecting a long form of an associated joining vowel and the short form vowel picker key for selecting a short form of the associated joining vowel.

6. The SIP of claim 5, wherein the joining vowel base keys are configured to, when touched and released, select a default one of the short form of the associated vowel or the long form of the associated vowel without any of the associated picker keys being activated.

7. The SIP of claim 6, wherein each of the joining vowel keys are configured to, when touched and released, selected the short form of the associated joining vowel without any of the picker keys being activated.

8. The SIP of claim 1, wherein the second group of keys comprises a plurality of adjacently positioned independent vowel base keys, the independent vowel base keys activating a respective vowel picker window having two or more vowel picker keys, the two or more vowel picker keys comprising a long form vowel picker key for selecting the long form of an associated independent vowel and a short form vowel picker key for selecting the short form of the associated independent vowel.

9. The SIP of claim 8, wherein each of the joining vowel base keys and the independent vowel base keys are configured to, when touched and released, select a short form of the respective associated vowel without any associated picker keys being activated.

10. The SIP of claim 1, wherein all vowels of the non-English language are grouped together in a row of keys on the main page of the SIP.

11. The SIP of claim 1, wherein the consonant base key has an associated picker comprising plural consonant picker keys.

12. The SIP of claim 11, wherein the plural consonant picker keys represent a group of consonants grouped together by sound.

13. The SIP of claim 11, wherein the plural consonant picker keys represent a group consonants grouped together by frequency of usage.

14. The SIP of claim 1, wherein the vowels, consonants, and diacritics available to be entered using the SIP are available to be entered without using any key that has a primary purpose of changing the function of other keys.

15. An electronic device comprising a touchscreen, the touchscreen being configured to be used as a soft input panel (SIP) for the electronic device, wherein the SIP is configured for entering text in a non-English language, wherein the characters used in the language are available to be entered with the SIP without switching between different pages of keys and without using a function key, wherein at least one of the keys on the main page of keys is a diacritic base key that is configured to open a diacritic picker window when activated, the diacritic picker window comprising plural diacritic picker keys, the plural diacritic picker keys representing different diacritics used in the language, wherein the SIP comprises a plurality of vowel keys grouped together in a row separate from consonant keys, the plurality of vowel keys comprising one vowel key for each vowel of the language, wherein each vowel key is configured to select either a short form or a long form of the respective vowel when touched and released, wherein the plurality of vowel keys comprises a plurality of joining vowel keys grouped together in a first portion of the row and a plurality of independent vowel keys grouped together in a second portion of the row, the second portion of the row adjoining the first portion of the row, wherein each of the independent vowel keys in the second portion of the row is configured to open an associated picker window when activated, each picker window comprising a first picker key for a long form of the respective independent vowel and a second picker key for a short form of the respective vowel.

16. The device of claim 15, wherein the SIP comprises a plurality of consonant keys, at least one of the consonant keys being a consonant base key that is configured to open a consonant picker window when activated, the consonant picker window comprising a plurality of consonant picker keys associated with plurality of consonants grouped together by sound.

17. An electronic device comprising a touchscreen, the touchscreen being configured to be used as a soft input panel (SIP) for the electronic device, wherein the SIP is configured for entering text in a non-English language, wherein the vowels, consonants and diacritics used in the language are available to be entered with the SIP without switching between different pages of keys and without using a function key;
    wherein at least one of the keys is a diacritic base key that is configured to open a diacritic picker window when activated, the diacritic picker window comprising plural diacritic picker keys, the plural diacritic picker keys representing different diacritics used in the language;
    wherein a plurality of the keys are vowel base keys configured to open a vowel picker window when activated, the vowel picker window comprising a short form vowel key and a long form vowel key;
    wherein joining vowels of the language are grouped together in a first group of keys and independent vowels of the language are grouped together in a second group of keys adjacent to the first group of keys; and
    wherein consonants of the language are grouped together in a third group of keys, at least one key of the third group of keys comprising a consonant base key configured to open a consonant picker window when activated, the consonant picker window comprising a plurality of consonant picker keys each associated with a different consonant of the language.

\* \* \* \* \*